(12) United States Patent
Tandukar et al.

(10) Patent No.: US 10,519,048 B2
(45) Date of Patent: Dec. 31, 2019

(54) CATHODE, ELECTROCHEMICAL CELL AND ITS USE

(71) Applicant: HÖGANÄS AB (PUBL), Höganäs (SE)

(72) Inventors: Madan Tandukar, Johnstown, PA (US); Kyle Unger, New Castle, PA (US); Paul Endler, Davidsville, PA (US)

(73) Assignee: HÖGANÄS AB (PUBL), Höganäs (SE)

( * ) Notice: Subject to any disclaimer, the term of this patent is extended or adjusted under 35 U.S.C. 154(b) by 892 days.

(21) Appl. No.: 14/889,055

(22) PCT Filed: May 9, 2014

(86) PCT No.: PCT/EP2014/059548
§ 371 (c)(1),
(2) Date: Nov. 4, 2015

(87) PCT Pub. No.: WO2014/184106
PCT Pub. Date: Nov. 20, 2014

(65) Prior Publication Data
US 2016/0075572 A1      Mar. 17, 2016

(30) Foreign Application Priority Data

May 13, 2013   (EP) .................................... 13167470

(51) Int. Cl.
*C02F 1/46*   (2006.01)
*C02F 1/461*   (2006.01)
(Continued)

(52) U.S. Cl.
CPC .......... *C02F 1/46114* (2013.01); *C02F 1/463* (2013.01); *C25B 1/04* (2013.01);
(Continued)

(58) Field of Classification Search
None
See application file for complete search history.

(56) References Cited

U.S. PATENT DOCUMENTS 3,846,300 A * 11/1974  Inoue .................. C02F 1/46104
                                                                205/742
3,926,754 A * 12/1975  Lee ......................... C02F 1/463
                                                                205/742

(Continued)

FOREIGN PATENT DOCUMENTS

EP   0 015 057 A2   9/1980
EP   0 595 178 A1   5/1994
(Continued)

OTHER PUBLICATIONS

International Search Report (PCT/ISA/210) dated Jun. 18, 2014, by the European Patent Office as the International Searching Authority for International Application No. PCT/EP2014/059548.

(Continued)

*Primary Examiner* — Arun S Phasge
(74) *Attorney, Agent, or Firm* — BUCHANAN INGERSOLL & ROONEY P.C.

(57) ABSTRACT

An electrochemical cell containing a sacrificial electrode suitable for electrocoagulation as well as an electrocoagulation process for removing various pollutants from water or wastewater by the use of the electrochemical cell. Also, the sacrificial electrode itself. Several electrochemical cells can be coupled to an electrochemical cell assembly. Certain aspects and embodiments are especially suitable for reduction of fluoride or fluoride in combination with heavy metals such as hexavalent chromium or arsenic.

25 Claims, 10 Drawing Sheets

Principal drawing of the electrocoagulation process

(51) Int. Cl.

| | |
|---|---|
| *C02F 1/463* | (2006.01) |
| *C25B 11/03* | (2006.01) |
| *C25B 11/04* | (2006.01) |
| *C25B 11/12* | (2006.01) |
| *C25B 1/04* | (2006.01) |
| *C02F 1/66* | (2006.01) |
| *C02F 101/10* | (2006.01) |
| *C02F 101/14* | (2006.01) |
| *C02F 101/22* | (2006.01) |

(52) U.S. Cl.
CPC ........ *C25B 11/035* (2013.01); *C25B 11/0405* (2013.01); *C25B 11/0478* (2013.01); *C25B 11/12* (2013.01); *C02F 1/66* (2013.01); *C02F 2001/46133* (2013.01); *C02F 2001/46152* (2013.01); *C02F 2001/46157* (2013.01); *C02F 2001/46161* (2013.01); *C02F 2001/46171* (2013.01); *C02F 2101/103* (2013.01); *C02F 2101/14* (2013.01); *C02F 2101/22* (2013.01); *C02F 2201/4613* (2013.01); *Y02E 60/366* (2013.01)

(56) References Cited

U.S. PATENT DOCUMENTS

| | | |
|---|---|---|
| 4,014,766 A | 3/1977 | Watanabe et al. |
| 4,200,515 A | 4/1980 | Hall et al. |
| 5,633,423 A | 5/1997 | Federici et al. |
| 2005/0167285 A1 | 8/2005 | Pushpavanam et al. |
| 2006/0000784 A1 | 1/2006 | Khudenko |
| 2011/0114510 A1* | 5/2011 | Norris ................. C02F 1/46114 205/687 |
| 2012/0055871 A1 | 3/2012 | Fresnel |

FOREIGN PATENT DOCUMENTS

| | | |
|---|---|---|
| SU | 882945 A1 | 11/1981 |
| WO | WO 2013/059964 A1 | 5/2013 |

OTHER PUBLICATIONS

Written Opinion (PCT/ISA/237) dated Jun. 18, 2014, by the European Patent Office as the International Searching Authority for International Application No. PCT/EP2014/059548.

* cited by examiner

Figure 1. Principal drawing of the electrocoagulation process

Figure 2. Electrolytic cell according to the invention

Figure 3a-c. Electrolytic cell according to the invention

Figure 4 a-c. Sacrificial part of the sacrificial anode according to the invention.

Figure 5. Settling velocity and fluoride removal capacity as a function of Iron to Aluminum ratio.

Figure 6. Rate of coagulant formation and Green Strength as a function of the porosity as described in example 5.

Figure 7. Principle flow chart of the electrocoagulation process according to the invention.

CATHODE, ELECTROCHEMICAL CELL AND ITS USE

FIELD OF INVENTION

The present invention relates to an electrochemical cell containing a sacrificial electrode suitable for electrocoagulation as well as an electrocoagulation process for removing various pollutants from water or wastewater by use of the electrochemical cell. The present invention also concerns the sacrificial electrode per se. Several electrochemical cells according to the invention can be coupled to an electrochemical cell assembly.

SUMMARY

One embodiment of the present invention provides a sacrificial electrode for the removal of single contaminants as well as for the simultaneous removal of multiple contaminants whereof one being fluoride. Another embodiment of the present invention provides an electrochemical cell and an electrochemical cell assembly containing a new electrode and in a further embodiment of the present invention it is provided a method for the removal of contaminants in water through electrocoagulation utilizing the electrochemical cell or electrochemical cell assembly containing the sacrificial electrode.

Certain aspects and embodiments of the invention are especially suitable for reduction of fluoride or fluoride in combination with heavy metals such as hexavalent chromium or arsenic.

One embodiment of the present invention is to provide a sacrificial anode containing a sacrificial part and a non-sacrificial electrical conductive part, characterized in that the sacrificial part having porosity between 20-60% by volume and preferably between 30-50% by volume and containing iron powder.

In one aspect of the present invention a sacrificial anode is characterized in that the sacrificial part contains a mixture of iron powder and aluminum powder.

In one aspect of the present invention a sacrificial anode is characterized in that the iron powder contains at least 90% by weight of iron, preferably at least 95% by weight of iron and most preferably at least 97% by weight of iron.

In one aspect of the present invention a sacrificial anode is characterized in that the weight ratio between iron powder and aluminum powder 50:50 to 98:2, preferably 60:40 to 98:2, and most preferably 70:30 to 95:5.

In one aspect of the present invention a sacrificial anode is characterized in that the sacrificial part is composed of non-compacted powder or powders.

In one aspect of the present invention a sacrificial anode is characterized in that the sacrificial part is composed of a compacted powder or powders, preferably compacted into toroid shape.

In one aspect of the present invention a sacrificial anode is characterized in that the non-sacrificial electrical conductive part of the anode is made of graphite or stainless steel.

In one aspect of the present invention a sacrificial anode is characterized in that the non-sacrificial electrical conductive part of the anode has a shape of a porous graphite basket or container.

In one aspect of the present invention a sacrificial anode is characterized in that the non-sacrificial electrical conductive part of the anode has a shape of a solid rod or bar.

In one aspect of the present invention a sacrificial anode is characterized in that the sacrificial part of the sacrificial anode is at least one toroid made of the compacted powder surrounding and in close electrical contact with the non-sacrificial electrical conductive part.

One embodiment of the present invention is to provide an electrochemical cell containing a sacrificial electrode according to any foregoing objects or aspects.

In one aspect of the present invention an electrochemical cell is provided containing a sacrificial electrode according to any foregoing objects or aspects characterized in that the anode and the cathode are identical in structure.

One embodiment of the present invention is to provide a method for removal of pollutants from water by electrocoagulation characterized in;
providing at least one electrochemical cell according to any foregoing embodiments or aspects.
contacting water to be purified with the at least one electrochemical cell while supplying an electric potential difference between the cathode and the anode.

In one aspect of the present invention a method is provided characterized in that the process is stopped when the sacrificial part of the sacrificial anode is at least partly consumed and optionally continued after replacement of the sacrificial part of the sacrificial anode.

In one aspect of the present invention a method is provided for removal of pollutants from water by electrocoagulation wherein when the anode and cathode are identical in structure the method further comprises the step of;
switching polarity when the sacrificial part of the sacrificial anode at least partly is consumed.

In one aspect of the present invention a method is provided for removal of pollutants from water by electrocoagulation wherein prior to, and/or during, the process pH is adjusted to a value which prohibits dissolution of formed hydroxide flocculants, preferably to a value between 5 and 8.

In one aspect of the present invention a method is provided for removal of pollutants from water by electrocoagulation wherein the potential difference between the anode and the cathode is sufficient to yield a current density between 15 and 300 A/m$^2$.

In one aspect of the present invention a method is provided for removal of pollutants from water by electrocoagulation wherein the water contains heavy metals such as chromium or arsenic.

In one aspect of the present invention a method is provided for removal of pollutants from water by electrocoagulation wherein the water contains fluoride

BACKGROUND

Electrocoagulation is a simple and effective method of generating metal hydroxide coagulants within water/wastewater by electro-oxidation of metals, such as iron and aluminum. Schematic and basic concept of electrocoagulation is presented in FIG. 1. When current is passed through the system, metal ions are released from sacrificial anode, whereas hydroxide ions and hydrogen gas are produced at cathode. The metal ions and hydroxide ions readily combine to form polymeric metal hydroxides, which are excellent coagulants.

Reactions that occur at the anode, cathode and bulk liquid are shown below with iron and/or aluminum as anode material;

At the anode;
Oxidation of metal;

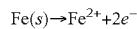

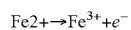

Oxidation of water;

$$2H_2O \rightarrow O_2 + 4e^- + 4H^+$$

At the cathode;
Production of hydrogen gas and hydroxide ions;

$$2H_2O \rightarrow H_2 + 2OH^-$$

$$4e^- + 4H^+ \rightarrow 2H_2$$

In bulk liquid; Formation of metal hydroxides:

$$Fe^{2+} + 2OH^- \rightarrow Fe(OH)_2$$

$$Fe^{3+} + 3OH^- \rightarrow Fe(OH)_3$$

In the case of an aluminum anode, the corresponding oxidation of the metal will be;

$$Al(s) \rightarrow Al^{3+} + 3e^-$$

and in bulk liquid the formation of metal hydroxide will be;

$$Al^{3+} + 3OH^- \rightarrow Al(OH)_3$$

Depending of the bulk liquid pH, mono- and polyhydroxides of the metals can be formed as follows;

$$Fe(OH)_2^+, Fe(OH)^{2+}, Fe(OH)_2, Fe(OH)_3, Fe(OH)_6^{3-}, Fe(OH)_4^-,$$

and in case of aluminum used as anode material examples of formed hydroxides are;

$$Al(OH)_2^+, Al(OH)_3, Al(OH)_4^-, Al_{13}(OH)_{34}^{5+}, Al_{13}(OH)_{32}^{7+}$$

The metal hydroxides form flocculants and remove the contaminants by ion exchange, adsorption, neutralization and sweep-floc action. Metal cations neutralize negative surface charges of colloidal particles and pollutants. Then the particles approach closer and agglomerate under the influence of van der Waals forces. Besides various types of ions, organic substances may effectively be removed in the form of sediment flocs by electrocoagulation. Factors such as current density, pH, electrode type, reaction time, etc., play important roles in the formation of metal hydroxides. Generally, higher current density produces more metal ions in the solution. Likewise, solubility of the metal hydroxides largely depends on pH of the solution. Optimum pH range for the formation of iron and aluminum hydroxide flocculants is between 5 and 8. However, the flocs become soluble at lower or higher pH values. pH is equally important for the interaction of metal flocculants with pollutants. For example, removal of fluoride by aluminum hydroxide is thought to be an ion exchange process. Fluoride ion replaces one hydroxide ion from aluminum hydroxide and makes a complex according to the following reaction;

$$Al(OH)_3 + xF^- \rightarrow Al(OH)_{(3-x)}F_x(s) + OH^-$$

In the patent literature a number of processes and materials related to electrocoagulation for remediating of water or wastewater are disclosed.

US2012/0055871 relates to an electrolysis method that uses iron particles and an aqueous solution containing sodium hypochlorite. The method characterized in that said method uses direct current, the iron particles from the anode and the sodium hypochlorite concentration of the aqueous solution is at least 1 g/L. The document further relates to a method and to a plant for the pretreatment of raw water for producing water that can be easily treated in order to produce drinkable water or so called technical water.

US2005/0167285 provides an electrochemical method for the removal of arsenate from drinking water, wherein the arsenate is removed by adsorption to metal hydroxide, formed by "in-situ" anodic oxidation. The application describes an electrochemical cell fitted with an anode of mild steel or aluminum plate and stainless steel cathode with an inter-electrode distance of 0.5 to 1.5 cm.

EP 0595178A1 describes a device and a process for electrolytic treatment of waste water. The water to be purified and treated first flows through at least one anode chamber containing an insoluble anode and then through another anode chamber containing a soluble permeable anode. Coke particles are added before water enters the soluble anode chamber to initiate a galvanic coagulation process. The porous sacrificial anode can be made of iron filings.

U.S. Pat. No. 4,014,766 discloses a process wherein wastewater is subjected to electrolysis in an electrolytic cell having an anode comprising an insoluble central electrode and a body of particulate iron pieces disposed there around and in electrical contact therewith, whereby impurities in the wastewater become occulted within flocculants of iron hydroxide formed by electrolytic dissolution of the iron pieces, and the flocculants containing the impurities is subjected to oxidation processing and is thereafter separated. A magnetic field can be applied to the wastewater thus treated thereby to promote sedimentation of the flocculants. Reduction of hexavalent chromium ions to trivalent chromium ions can be carried out efficiently in neutral or alkaline condition without using acidic condition which was the case when iron plates were used.

US2006/0000784 describes a method of water or wastewater treatment for removal of pollutants in at least two-step process comprising (a) treatment of water producing at least partially treated intermediate effluent, (b) treatment of the intermediate effluent with a sacrificial metal and producing ions of said sacrificial metal, and providing very thoroughly treated effluent, (c) recuperating sacrificial metal ions generated in step (b) and recycling the recuperated ions in the step (a), the recuperated and recycled ions from the step (c) improve treatment efficiency of step (a) by additionally removing pollutants from the intermediate effluent using recuperated ions, resulting in cleaner intermediate effluent and therefore the pollutant loading in step (b) is reduced, intermediate effluent is further treated more thoroughly, and the demand for sacrificial metal in step (b) is reduced. Step (a) can preferably be biological, biological-abiotic, physical chemical or combinations of these steps.

A variety of pollutants is supposed to be removed such as, heavy metals, organic compounds, dissolved substances, suspended solids, solid particles, nutrients, ammonia, nitrates, nitrites phosphates, microorganisms etc.

WO 2013/059964 A1 describes a self-assembling high surface area electrode which includes an electrode substrate, magnetic electrode particles and a magnetic field source. Under the influence of the magnetic field source, the magnetic particles assemble on the surface of the electrode substrate. The electrode can be used as an anode and/or a cathode in an eltrocoagulation system for treating contaminated feed water. The document further mentions that a suitable material for magnetic electrode particles is iron particles.

EP0015057A2 describes an invention which provides electrodes for water electrolyzers that are cheaper than electrodes composed wholly of sintered particles and gives as good, or lower overpotentials in the release of gases as electrodes composed wholly of sintered materials. The electrodes according to this document have an impervious, electrically conductive substrate, and bonded to the substrate, a porous metallurgically bonded layer from 25-275

μm thick made of nickel, nickel-iron alloy, iron or iron-carbon alloy particles having a diameter of 2 to 30 μm that are sintered to a theoretical density of from 45 to 65%.

Electrocoagulation has been used for a number of years and has been proved to be an efficient method for removal of various pollutants from water and wastewater. However, there is still a need for improving the process, especially related to simultaneous removal of multiple contaminants including fluoride ions and to obtain a process having increased energy efficiency.

DRAWING DESCRIPTIONS

FIG. 1 shows a principal drawing of one embodiment of the electrocoagulation process according to the present invention.

The anode is connected to the positive pole of the current source; cations are released from the anode into the solution and transported to the negative cathode where hydrolysis takes place producing hydroxide ions and hydrogen gas, electrodes travel from the anode through the outer circuit to the cathode causing electrolysis of water and reduction of cations. An example of reduction of metal ion pollutants is reduction of $Cr^{6+}$ ions to $Cr^{3+}$ ions, competing with the hydrolysis.

FIG. 2a is a top view, FIG. 2b a front view and FIG. 2c a side view of an electrolytic cell comprising an anode and a cathode wherein the sacrificial parts of the electrodes consist of powder and the non-sacrificial electric conducting parts are porous graphite baskets, containing the powder.

(a) is the water level,
(b) are porous graphite baskets,
(c) are supporting rod materials made of PVC or other suitable materials,
(d) are electrodes made of iron powder or iron powder mixed with aluminum powder,
(e) are conductive copper strips.

FIG. 3a is a top view, FIG. 3b a front view and FIG. 3c a side view of another embodiment of an electrolytic cell of the present invention where the sacrificial parts of the anode are composed by a multiple of toroid shaped bodies of compacted iron powder or a compacted mixture of iron powder and aluminum powder. The non-sacrificial electric conducting part of the anode is a graphite rod in close and electric contact to the inner surfaces of the toroids. The cathode is constructed and consists of the same material as the anode.

the electrolytic cell.
(a) is the water level,
(b) are graphite rods,
(c) are stabilizing clamps made of copper or other conductive materials
(d) are supporting rods made of PVC or other suitable materials,
(e) are electrodes made of compacted iron powder or compacted mixtures of iron powder and aluminums powder,
(f) are conductive copper strips.

FIG. 4a-c are principal drawings of the compacted sacrificial part from different angles of the sacrificial anode according to the invention.

Figure 10:
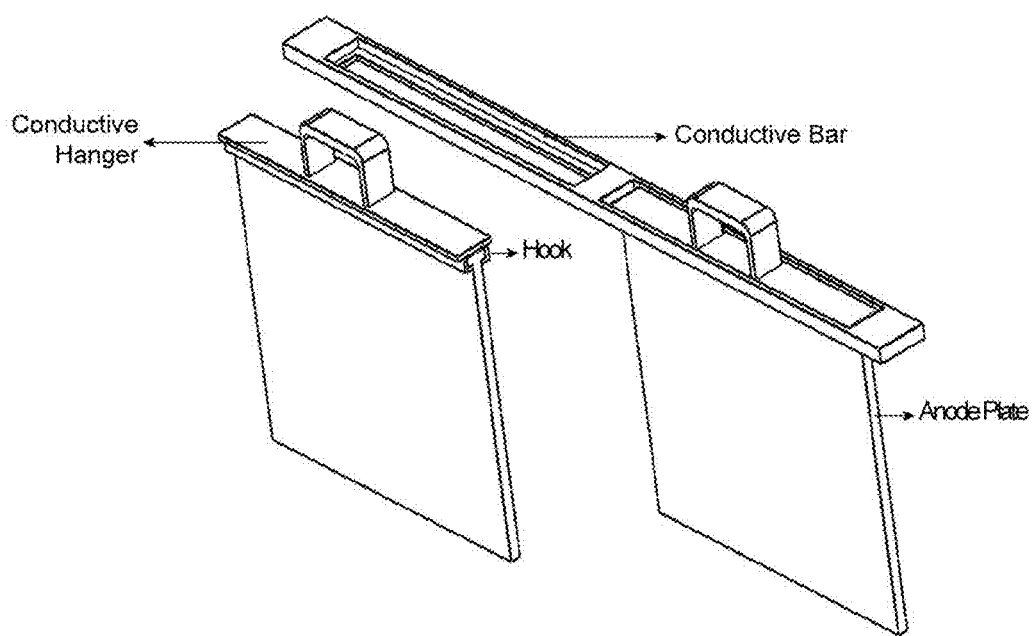

FIG. 10 shows an embodiment of the present invention where the sacrificial part contains or consists of plates of compacted iron powder or compacted mixture of iron powder and aluminum powder. The size of the plates may be 20-100 cm×20-100 cm×0.5-2 cm. The non-sacrificial part of the anode constitutes of a conductive hanger.

DETAILED DESCRIPTION

The present invention reveals an electrochemical cell, and an electrochemical cell assembly, containing a sacrificial anode and a cathode to be used in an electrocoagulation process as well as a method for reducing the amount of pollutants in water or wastewater by the use of the electrochemical cell in an electrocoagulation process. The present invention also concerns the sacrificial electrode per se. Certain aspects and embodiments of the invention are especially suitable for reduction of fluoride or fluoride in combination with heavy metals such as hexavalent chromium or arsenic.

One embodiment of the present invention is to provide a sacrificial anode containing a sacrificial part and a non-sacrificial electrical conductive part, characterized in that the sacrificial part having porosity between 20-60% by volume and preferably between 30-50% by volume and containing iron powder.

In one aspect of the present invention a sacrificial anode is characterized in that the sacrificial part contains a mixture of iron powder and aluminum powder.

In one aspect of the present invention a sacrificial anode is characterized in that the iron powder contains at least 90% by weight of iron, preferably at least 95% by weight of iron and most preferably at least 97% by weight of iron.

In one aspect of the present invention a sacrificial anode is characterized in that the weight ratio between iron powder and aluminum powder 50:50 to 98:2, preferably 60:40 to 98:2, and most preferably 70:30 to 95:5.

In one aspect of the present invention a sacrificial anode is characterized in that the sacrificial part is composed of non-compacted powder or powders.

In one aspect of the present invention a sacrificial anode is characterized in that the sacrificial part is composed of a compacted powder or powders, preferably compacted into toroid shape.

In one aspect of the present invention a sacrificial anode is characterized in that the non-sacrificial electrical conductive part of the anode is made of graphite or stainless steel.

In one aspect of the present invention a sacrificial anode is characterized in that the non-sacrificial electrical conductive part of the anode has a shape of a porous graphite basket or container.

In one aspect of the present invention a sacrificial anode is characterized in that the non-sacrificial electrical conductive part of the anode has a shape of a solid rod or bar.

In one aspect of the present invention a sacrificial anode is characterized in that the sacrificial part of the sacrificial anode is at least one toroid made of the compacted powder surrounding and in close electrical contact with the non-sacrificial electrical conductive part.

One embodiment of the present invention is to provide an electrochemical cell containing a sacrificial electrode according to any foregoing objects or aspects.

In one aspect of the present invention an electrochemical cell is provided containing a sacrificial electrode according to any foregoing objects or aspects characterized in that the anode and the cathode are identical in structure.

One embodiment of the present invention is to provide a method for removal of pollutants from water by electrocoagulation characterized in;
- providing at least one electrochemical cell according to any foregoing embodiments or aspects.
- contacting water to be purified with the at least one electrochemical cell while supplying an electric potential difference between the cathode and the anode.

In one aspect of the present invention a method according to any foregoing embodiments or aspects is provided characterized in that the process is stopped when the sacrificial part of the sacrificial anode is at least partly consumed and optionally continued after replacement of the sacrificial part of the sacrificial anode.

In one aspect of the present invention a method is provided for removal of pollutants from water by electrocoagulation wherein when the anode and cathode are identical in structure the method further comprises the step of;
- switching polarity when the sacrificial part of the sacrificial anode at least partly is consumed.

In one aspect of the present invention a method is provided for removal of pollutants from water by electrocoagulation wherein prior to, and/or during, the process pH is adjusted to a value which prohibits dissolution of formed hydroxide flocculants, preferably to a value between 5 and 8.

In one aspect of the present invention a method is provided for removal of pollutants from water by electrocoagulation wherein the potential difference between the anode and the cathode is sufficient to yield a current density between 15 and 300 A/m$^2$.

In one aspect of the present invention a method is provided for removal of pollutants from water by electrocoagulation wherein the water contains heavy metals such as chromium or arsenic.

In one aspect of the present invention a method is provided for removal of pollutants from water by electrocoagulation wherein the water contains fluoride.

The following equations provide theoretical relationships between fundamental characteristics of the electrocoagulation process applicable to the invented process and the invented device.

Anode Material Consumption

In the electrocoagulation process, anode is sacrificial and loses mass over time. Loss of anode mass is a function of charge loading (electric current) and electrode type. Theoretical mass loss can be computed using the following equation;

$$Mm = IMw*60/zF$$

Where, $Mm$ is the anode mass loss per minute (g*min$^{-1}$), I is the current (A), Mw is the molecular weight of the metal (g*mol$^{-1}$), z is the number of electrons released during the metal oxidation (2 or 3 for Fe and 3 for Al) and F is Faraday's constant (96,486 C*mol$^{-1}$). Based on the above equation, whenever one Faraday of charge is passed through the circuit, 8.99 g of aluminum and 18.6 g of iron are dissolved into the solution from the anode. The loss in anode mass directly affects pollutant removal.

Energy Consumption, Conductivity, and Faradic Yield

Energy consumption depends on voltage difference applied across the electrodes, current, and reaction time. On the other hand, reaction time depends on the pollutant concentration. Energy consumption per mass of pollutant removal can be calculated using the following equation;

$$Ec = VItr/Cr$$

Where $Ec$ is the total energy consumption per mass of pollutant removed (kWh*g$^{-1}$), V is the cell potential (V), I is the current (A), tr is the reaction time, and Cr is the mass of pollutant removed in time tr. At constant applied cell potential, current through the circuit depends on the conductivity of the water. Most of the groundwater and wastewater have high enough conductivity to ensure sufficient current flow for the reaction. However, in some cases, addition of secondary electrolytes could be helpful to raise conductivity of the water and hence the flow of current. Secondary electrolytes that give chloride ions are especially helpful as chloride ions help to remove some masking agents that coats anode surface over time. This masking phenomenon can largely reduce the system efficiency.

Examples of secondary electrolytes also used as anti-masking agents are potassium chloride or sodium chloride. System efficiency can be evaluated by calculating Faradic yield or current efficiency (CE), which is defined as the ratio of actual anode consumption (Ma) to the theoretical value (Mt), which can be calculated according to;

$$CE(\%) = Ma*100/Mt$$

Actual anode loss can be quantified by gravimetric analysis of dry anode before and after the reaction. In reality, Faradic yield might be higher than 100% because of spontaneous oxidation of metal in water.

Production of Electrocoagulation Sludge

The electrocoagulation process produces flocs that eventually agglomerate and settle at the bottom of the reaction chamber as sludge. Metal hydroxide like Al(OH)$_3$ has high chemical and physical affinity towards water. As a result, the electrocoagulation sludge has high water content although having good settleability. Mass of sludge produced per minute (g*min$^{-1}$) can be calculated considering the following equation;

$$Sm = (60*I*(Mw/z+17))/F$$

The amount of sludge produced during the process can also be quantified by gravimetric method at the end of the process.

Production of Hydrogen Gas

The electrolysis of water at cathode produces hydrogen gas. Volume of hydrogen gas produced depends on the number of electrons delivered by the cathode. According to the reaction stoichiometry, two moles of electrons are consumed for the production of one mole hydrogen gas. Number of moles of electrons (Me$^-$) released by the cathode during the reaction time of tr (sec) can be calculated using the following equation;

$$Me^- = I*tr/F$$

Based on the above, volume of hydrogen gas (VH$_2$) in mL, produced during the reaction time of tr (sec) at temperature T (K) and pressure P (atm) can be calculated using the following equation;

$$VH_2 = (11,207*I*tr/273.15)/(F*P)$$

This equation calculates the volume of hydrogen gas produced from the process when there is no competing ion for electrons at the cathode. If competing ions such as, hexavalent chromium ions, are present, hydrogen gas production will be lower than the theoretical value. Hydrogen gas is a useful byproduct of the electrocoagulation process.

The sacrificial electrode of the invention, the anode, comprises a sacrificial part and a non-sacrificial electrical conductive part, characterized in that the sacrificial part having porosity between 10-70% by volume, preferably between 20-60% by volume and most preferably between 30-50% by volume and containing iron powder. Other intervals of interest may be 20-55% by volume, preferably 25-55% by volume and most preferably 30-55% by volume.

The sacrificial part of the sacrificial anode contains iron powder or a mixture of iron powder and aluminum powder and a non-sacrificial electric conductive part.

The cathode may be made of graphite, conductive metal such as stainless steel or titanium, or other conductive materials as long as the material does not release harmful substances to the water.

In one embodiment the sacrificial part of the sacrificial electrode has a porosity of 30-60% by volume, preferably 30-40% by volume and contains 10-30% by weight of aluminum powder and 70-90% by weight of iron powder, preferably 15-25% by weight of aluminum powder and 75-85% by weight of iron powder.

In one embodiment the anodes and cathodes are substantially identical in physical structure and composition.

The non-sacrificial part may be made of any suitable electric conductive material preferably in shape of a rod or bar.

In one embodiment of the present invention the non-sacrificial part of the anode is made of plastic such as poly propylene or PVC, having a rod shape, with a groove for accommodating an electric conductive rod or bar distributing electric current to the sacrificial part(s). This embodiment may be attractive from a cost point of view as less material of the more costly electric conductive material is used.

In one embodiment of the present invention the non-sacrificial part of the anode is made of plastic such as poly propylene or PVC, having a rod shape surrounded by an electrical conductive sleeve. Electricity is distributed to the sacrificial part(s) through the conductive sleeve which may be made of a metal, such as stainless steel. In one aspect the sleeve is only in contact with the sacrificial part(s) above the water level. This aspect has the advantage that the conductive part is not affected by the water, preventing corrosion or degradation.

In one embodiment the non-sacrificial electrical conductive part of the anode is made of graphite.

In one embodiment the non-sacrificial electric conductive part consist of a solid graphite rod or bar.

In one embodiment the non-sacrificial electric conductive part is made of stainless steel.

In one embodiment the non-sacrificial part of the anode constitutes of a conductive fastener for the sacrificial part, such as a conductive hanger.

In one embodiment the powder or powders are contained in a porous basket or container, preferably made of graphite or stainless steel, providing electrical current to the powdered metal electrode, the porous graphite basket or stainless steel basket thus constitute the non-sacrificial electric conductive part. The porous graphite basket preferably should have a porosity of 30-50% by volume.

In one embodiment the non-sacrificial part may contain graphite coated polymer.

In one embodiment the sacrificial part of the anode is composed of non-compacted powder or powders.

In one embodiment the sacrificial part of the anode is composed of compacted powder or powders, preferably compacted into toroid shape.

In one embodiment the sacrificial part of the anode is composed of compacted powder or powders, preferably compacted into plate shape.

In one embodiment the compacted toroid has a porosity of up to 70% by volume.

In one embodiment the toroid is compacted at a compaction pressure of at least 70 MPa to obtain sufficient strength and a porosity of 10-70% by volume, preferably between 20-60% by volume, most preferably 30-50% by volume.

In another embodiment of the present invention the sacrificial electrode contains or consists of bodies of the compacted powder or powders surrounding and in close and electric contact with a non-sacrificial graphite bar or rod or a stainless steel bar or rod, preferably a graphite bar or rod, providing the electrical current to the compacted powder electrode.

In a preferred embodiment the compacted bodies are shaped as toroid.

In another preferred embodiment of the present invention the sacrificial part contains part contains or consists of plates of compacted iron powder or a compacted mixture of iron powder and aluminum powder.

In another preferred embodiment of the present invention the sacrificial part contains or consists of plates of compacted iron powder or compacted mixture of iron powder and aluminum powder. The size of the plates may be 20-100 cm×20-100 cm×0.5-2 cm. The porosity of the plates may be up to 60% by volume, preferably between 10-60% by volume or 20-50% by volume and most preferably 30-40% by volume.

There are in principal no size and weight limitations of the compacted bodies as long as they are compatible with standard compaction processes and are able to be handled without being disintegrated. However, a preferred size of a toroid has an outer diameter of 1-6 cm, an inner diameter of 0.25-4 cm, a height of 1-6 cm a weight between 30 and 150 grams.

In embodiments where the sacrificial anode constitutes of powder contained in a porous graphite basket, the preferred dimensions of the basket are 20-50 cm in length, inner diameter of 2-5 cm and outer diameter of 3-6 cm, being able to hold 70 to 1,000 g of iron powder or a mixture of iron powder and aluminum powder.

In one embodiment the cathode is in principal made of the same material and in principal constructed in the same manner as the sacrificial anode, the anode and the cathode being substantially identical in structure. In this case the current can be reversed when the sacrificial anode is consumed, or consumed to a certain degree, thus the former cathode turns into a sacrificial anode and the remaining electrical conductive non-sacrificial part of the former anode turns into the cathode. In these cases only the graphite rods or the graphite baskets will remain of the electrodes.

This embodiment has the following advantages:
Low operational time and cost.
Low maintenance of the system.
Eliminates any electrode fouling during the operation.
  Electrode fouling is a phenomenon of inactivation of electrode (especially anode) by the formation of various ion coatings on the electrode surface. By reversing current, (anode becoming cathode), the ion coating can be removed from the electrode.

Electrocoagulation Process

The electrocoagulation process according to the invention utilizes the described electrolytic cell or electrolytic cell assembly. The water to be purified is contacted with the electrochemical cell or electrochemical cell assembly. The process could be a batch process or a continuous process. The potential difference between the anode and the cathode shall normally be sufficient to yield a current density between 15 and 300 A/m². Below 15 A/m² the reaction may be too slow and above 300 A/m² the formation of sludge and energy consumption may be excessive. However, in certain applications current densities outside 15-300 Amp/m² may be preferred. Normally DC is applied, however AC may be used especially when anode and cathode are substantially identical in structure. Use of AC may mitigate fouling problems and simplify the electrical equipment.

In order to prevent dissolution of formed hydroxide flocs, pH of the water to be purified is regulated before the process starts and/or during the process, preferably to a value between 5 and 8.

Before and/or during the process an electrolyte may be added in order to increase the conductivity of the water to be treated.

In one embodiment water containing heavy metals such as hexavalent chromium or arsenic is treated. In one embodiment water containing fluoride or fluoride in combination with heavy metals such as hexavalent chromium or arsenic is treated.

In one embodiment the process is stopped when the sacrificial part of the sacrificial anode is at least partly consumed and optionally continued after replacement of the sacrificial part of the sacrificial anode.

Iron Powder

Suitable iron powders to be used in the sacrificial anode may be atomized pure iron powders, such as water atomized iron powders, chemically reduced iron powders such as CO reduced or $H_2$ reduced.

The Fe content of the iron powder may preferably be above 90% by weight. Particle size of the iron powder may preferably be chosen so that a porous structure of the sacrificial anode is obtained when the powder is present as a loose powder contained in a porous graphite basket or present in a compacted body. Powders having too fine particle size are less suitable as such powders tends to be less permeable for liquids, on the other hand too coarse particles have less surface to volume ratio which hinders the release of positive ions to the water to be treated.

Coarser iron powder may also be difficult to compact into bodies having sufficient strength and porosity. Suitable powder may have a particle size distribution between 10 μm and 1 mm and an apparent density as measured according to ISO 3923-1:2008 between 0.8-3.0 g/cm³. The specific surface area may be between 0.1 and 0.5 m²/g as measured according to BET.

A preferred iron powder to be used may have a content of Fe of at least 90% by weight, preferably at least 95% by weight, most preferably at least 97% by weight. The remaining elements in the iron powder being oxygen at content of up to 2.5% by weight and other inevitable impurities.

The amount of oxygen and other inevitable impurities depends on raw material used for the production of the iron powder and on the production method. Examples of inevitable impurities are C, S, P, Si, Mn, Cr, Cu, Mo, Ni, Al at a total content below 2% by weight, preferably below 1% by weight and most preferably below 0.5% by weight.

In a preferred embodiment the amount of particles below 45 μm being at most 20% by weight, preferably at most 12% by weight. The amount of particles between 45 and 150 μm being 5-50% by weight, preferably 11-30% by weight. The amount of particles between 150 and 250 μm being 5-50% by weight, preferably 10-35% by weight. The amount of particles between 250 and 850 μm being 20-80% by weight, preferably 30-70% by weight. The amount of particles between 850 and 1000 μm being 0-2% by weight.

The Apparent Density may be between 0.8-3.0 g/cm³, preferably between 0.8 and 2.5 g/cm³, most preferably between 1.2-1.8 g/cm³. The specific surface area may be between 0.1 and 0.5 m²/g as measured according to BET.

Aluminum Powder

In embodiments where Al powder is contained in the sacrificial part of the electrode the content of Al in the Al powder may preferably be between 90 and 99% by weight and the particle size distribution between 4.5 and 875 μm.

Mixture of Iron Powder and Aluminum Powder

It has been shown that the combination of iron and aluminum in the sacrificial anode yields a combined effect of effective fluoride removal and sufficient settling velocity of the coagulants formed.

The ratio between iron powder and aluminum powder in embodiments containing both powders may be minimum 50:50, preferably minimum 60:40, most preferably minimum 70:30 in order not to result in unaccepted high residues of aluminum ions in the processed water and prolonged settling. On the other hand the maximum ratio between iron powder and aluminum powder in embodiments containing both powders may be 98:2, preferably 95:5, in order to achieve sufficient fluoride removal capacity. Thus the ratio between iron powder and aluminum powder may be 50:50 to 98:2, preferably 60:40 to 98:2, and most preferably 70:30 to 95:5. This can also be expressed as that the content of aluminum powder in the sacrificial part of the electrode may be 2-50% by weight, preferably 2-40% by weight, most preferably 5-30% by weight. Other intervals of interest may by 10-30% by weight or 15-25% by weight of aluminum powder.

EXAMPLES

The following examples intend to illustrate the invention but are not meant to limit the claimed invention.

Example 1

Sacrificial anodes were produced from iron powder and from mixtures of iron powder and aluminum powder. The Fe content of the iron powder was about 97% by weight.

The amount of iron particles having a particle size below 45 μm was 3.5% by weight, the amount of particles having a particle size below 75 μm was 8% the amount of particles having a particle size above 150 μm was 75% and the amount of particles having a particle size above 250 μm were 50%. Apparent density of the iron powder according to ISO was 1.3 g/cc and specific surface area between 0.2 and 0.24 m²/g, according to BET.

The aluminum powder used was a commercially available aluminum powder having a mean particle size of 462 μm and a content of Al of 99% by weight. Dog-bone shaped anodes made from metal powder mixtures of 10 grams each as described in table below were compacted at compaction pressures of 139 MPa. Table 1 shows the compositions of the anodes.

TABLE 1

| Sample | % Iron Powder | % Aluminum Powder | Porosity (%) |
|---|---|---|---|
| Fe | 100 | 0 | 67% |
| 95 Fe | 95 | 5 | 62% |
| 90 Fe | 90 | 10 | 61% |
| 80 Fe | 80 | 20 | 54% |
| 70 Fe | 70 | 30 | 48% |
| 60 Fe | 60 | 40 | 42% |
| 50 Fe | 50 | 50 | 36% |

Fluoride (NaF) and KCl as supporting electrolyte were added to deionized water. The concentration of fluoride was 20 mg/L and of the concentration of KCl was 1 g/L. 0.2 mL of 1 molar HCl was also added to lower pH of the solution to approximately 2.53. Conductivity of the solution was measured to be 4.91 mS/cm with an HACH conductivity meter (HACH HQ14d). Separate tests were performed using 95Fe, 90Fe, 80Fe and 50Fe dog bone shaped sacrificial anodes. Steel bars were used as cathodes. In all tests 28 volt DC potential difference was applied across the electrodes which correspond to approximately 0.5 A.

Each test was conducted for 60 minutes and samples were taken after various time periods. pH was not controlled during the test. The fluoride concentration was measured with an HACH DR 5000™ UV-Vis Spectrophotometer and pH was measured with a standard HACH pH meter.

The following table shows the fluoride concentration and pH at each sampling time.

TABLE 2 fluoride concentration and pH

| | Anode | | | | | | | |
|---|---|---|---|---|---|---|---|---|
| | 95 Fe/5 Al | | 90 Fe/10 Al | | 80 Fe/20 Al | | 50 Fe/50 Al | |
| Time [minutes] | [F— mg/l] | pH | [F— mg/l] | pH | [F— mg/l] | pH | [F— mg/l] | pH |
| 0 | 19.9 | 2.4 | 19.7 | 2.5 | 19.7 | 2.5 | 19.7 | 2.5 |
| 5 | 13.2 | 5.6 | | | | | | |
| 10 | 9.9 | 6.4 | 3.2 | 5.9 | 0.5 | 6.2 | | |
| 15 | 11.3 | 6.9 | | | | | 6.9 | 5.0 |
| 20 | 13.4 | 6.8 | 7.4 | 8.9 | 1.1 | 6.9 | | |
| 30 | 9.8 | 7.2 | 9.7 | 8.9 | 1.4 | 8.0 | 0.6 | 6.4 |
| 40 | 12.3 | 10.3 | 6.5 | 9.8 | 4.0 | 8.7 | | |
| 45 | | | | | | | 0.8 | 7.9 |
| 50 | 12.3 | 10.8 | 5.3 | 10.1 | 5.7 | 9.2 | | |
| 60 | 12.1 | 10.8 | 2.9 | 10.3 | 6.1 | 9.5 | 0.6 | 8.2 |

The results in Table 2 revealed that higher aluminum content in the anode drastically increases the rate of fluoride removal from the water. However, fluoride removal (decrease of fluoride concentration to about 1 ppm), from anode with lower aluminum content is also achievable although the rate of the reaction is slower. Fluoride removal from anodes containing more than 80% aluminum took less than 30 minutes. However, anode with lower aluminum contents can be expected to take more than 2 hours for complete fluoride removal, (below 0.2 ppm). Manipulation of reaction pH during the reaction also significantly increases the fluoride removability. In the presented example, pH increased due to formation of hydroxide ions. Because of the pH increase, hydroxide ion concentration increases and displaces fluoride ions from the formed $Al(OH)_{(3-x)}F_x$ complex. As a result it is beneficial to keep pH below 6.5, but above 6.0 (closer to the isoelectric point of $Al(OH)_3$) during electrocoagulation process. pH manipulation also shortens the reaction time, which is more economical.

From table 2 it can also be concluded that fluoride removal at pH 6-6.5 is obtained fastest for anode containing about 20% Al. It is therefore believed that a preferred anode composition contains about 10-30% Al, preferably 15-25% Al.

Example 2

Hexavalent chromium contaminated waste water according to table 3 was used.

TABLE 3

| characteristic of waste water | |
|---|---|
| Total Cr [mg/L] | 3.88 |
| Hexavalent Cr [mg/L] | 3.39 |
| Trivalent Cr [mg/L] | 0.48 |
| pH | 3.53 |
| Conductivity [mS * cm$^{-1}$] | 6.20 |

A sacrificial anode was constructed by filling 200 grams of iron powder according to the following table 4, in a porous plastic tube connected to insulated copper wire. The porous plastic tube has a length of 11 cm and diameter of 3 cm. Distance between anode and cathode was kept constant at 3 cm.

TABLE 4

| characteristic of iron powder | |
|---|---|
| Fe content [% by weight] | >97 |
| Apparent Density according to ISO [g/cm3] | 1.3 |
| Specific surface BET [g/cm3] | 0.22 |
| Amount less than 45 μm [% by weight] | 3.5 |
| Amount less than 150 μm [% by weight] | 25 |
| Amount above 250 μm [% by weight] | 50 |
| Amount above 850 μm [% by weight] | 0 |

Graphite electrode was used as cathode. For the test, the wastewater was diluted twice using deionized water and 1.48 g/L of KCl was added as supporting electrolyte. Potential difference of 7.6 V was applied across the electrodes and the current (DC) through the circuit was measured to be 0.24 A. Samples of the treated wastewater were collected and analysed. pH was adjusted by addition of HCl after 6.3 hours.

The following Table 5 shows the analysis results.

TABLE 5

| Time [hours] | pH | Total Cr [mg/L] | Cr (VI) [mg/L] | Cr [III] [mg/L] |
|---|---|---|---|---|
| 0 | 3.5 | 1938 | 1695 | 243 |
| 1 | 4.4 | 1620 | 1505 | 115 |
| 2 | 5.6 | 1434 | 1390 | 44 |
| 3 | 6.2 | 1229 | 1170 | 60 |
| 4 | 6.7 | 1040 | 1020 | 20 |
| 5 | 7.3 | 960 | 955 | 5 |
| 6.5 | 12.3 | 910 | 865 | 54 |
| 7.5 | 1.3 | 719 | 304 | 45 |
| 8.6 | 2.2 | 667 | 5.3 | 415 |
| 9.0 | 5.4 | | | 661 |
| 9.6 | 6.0 | | | |
| 10 | 7.3 | 0.008 | 0 | 0.008 |

In this example, $Cr^{6+}$ ions in wastewater was effectively reduced to $Cr^{3+}$ ions and subsequently precipitated as hydroxide containing flocs in the electrocoagulation process with sacrificial anode according to the present invention. During the process, the target pH was between 6 and 7.5 in order to obtain optimal reduction of chromium reduction and precipitation. After 11 hours almost all Cr6+ was removed and the final total chromium concentration was as low as 8 ppb. The reaction time may be shortened by increasing the current density and continuously monitoring and controlling the pH. Energy consumption during the process was measured to only 18 kWh per m$^3$ corresponding to 4.87 kWh per kg of total chromium.

Example 3

This example shows that fluoride can be successfully removed from drinking water using a sacrificial anode containing 80 to 90% Fe and 10 to 20% Al provided that pH is controlled at suitable levels. The iron and aluminum powder used were the same as described in Example 1.

By composition, two types of sacrificial anodes were produced as follows: (1) 90% Fe powder and 10% Al powder; (2) 80% Fe powder and 20% Al powder. The metal powder mixtures were compacted into toroid shapes having an inner diameter of 2 cm, outer diameter of 4 cm, and height of 2 cm at a compaction pressure of 83 MPa. As non-sacrificial parts of the sacrificial anodes, graphite rods were used. Similar type of graphite rods were used as cathodes.

In total 52 toroid-shaped electrodes were used for one electrolytic cell assembly. The volume of each batch test was 105 liter of water spiked with fluoride to give an initial fluoride concentration of 10 mg/liter. During the process pH of the water was maintained between 5.9 and 6.6 by using 0.5 M HCl. In order to increase the conductivity of the water NaCl solution was added. The test runs were divided into two phases based on the type of the anode used. In Phase 1, anodes containing 90% Fe and 10% Al were used. In Phase 2, anodes containing 80% Fe and 20% Al were used. Two separate batch tests were performed for each phase. Apart from the type of the electrodes used, all other operating parameters were kept the same.

The following Table 6 shows the operating parameters.

TABLE 6 operating parameters and test results.

| | Phase 1 | Phase 2 |
|---|---|---|
| Iron to Aluminum Ratio | 90:10 | 80:20 |
| Electrode Porosity (%) | 52 | 44 |
| Water Volume Treated (L) | 105 | 105 |
| Initial Water Conductivity (μS/cm) | 1,221 ± 86 | 1,276 ± 29 |
| Initial Water pH | 3.68 | 4.25 |
| Final Water pH | 5.95 | 6.56 |
| Initial Fluoride Concentration (mg/L) | 11.3 ± 0.1 | 11.7 ± 0.2 |
| Final Fluoride Concentration (mg/L) | 0.46 ± 0 | 0.4 ± 0 |
| Fluoride Removal (%) | 96% | 97% |
| Sludge Production (g/L Treated Water) | 0.64 | 0.65 |
| Sludge Produced/F— removed (mg Solids/mg F—) | 59.5 | 57.8 |
| Final Soluble Fe in Treated Water (mg/L) | 0.53 | 0.50 |
| Final Soluble Al in Treated Water (mg/L) | 0.09 | 0.09 |
| Mean Current (Amp) | 24.6 ± 4.8 | 29.0 ± 5.1 |
| Mean Voltage (V) | 45.3 ± 1.0 | 44.2 ± 1.3 |
| Current Density (Amp/m2) | 80.1 | 94.6 |
| Operation Time (min) | 120 | 120 |
| Power Consumption/L of Treated Water (kWh) | 0.02 | 0.02 |

The following Table 7 shows the fluoride concentration with respect to time for the two phases.

TABLE 7

| Time (Min) | Phase 1, F— (mg/L) | Phase 2, F— (mg/L) |
|---|---|---|
| 0 | 11.3 ± 0.06 | 11.7 ± 0.19 |
| 30 | 9.3 ± 0.06 | 6.5 ± 0.09 |
| 60 | 6.5 ± 0.07 | 2.1 ± 0.02 |
| 120 | 0.46 ± 0.02 | 0.4 ± 0.0 |

The example demonstrates that fluoride in the water can be effectively removed within two hours process time using either type of anode used in the test. Both anodes containing 90 or 80% Fe and 10 or 20% Al removed fluoride equally efficiently. Current density (DC) in Phase 1 and Phase 2 were 80.1 and 94.6 A/m2, respectively. However, the total power consumption per unit volume of water was similar in both cases. Iron and aluminum residue in the treated water was not significant in both cases.

Example 4

In this example, dog-bone shaped sacrificial anodes were used with various contents of iron and aluminum. The iron and aluminum powder used was the same as described in Example 1. Details of the anode composition are shown in following Table 8. DC voltage of 28-30 V was applied and the current was 0.5-0.6 A. In this example, initial fluoride concentration in the water was kept constant at 20 mg/L and the electrocoagulation process was run with different types of anode for 30 minutes. Except for the composition of metal powders in the anode, all other parameters were kept constant in the test. The example demonstrates that higher aluminum content in the anode enhances fluoride removal. However, settling velocity of the flocculants is negatively affected by increased aluminum content in the anode. Better settling velocity was achieved with anode having higher iron content.

Settling velocity was measured by using a 1-liter graduated cylinder and expressed as meters per hour, [m/h].

| Fe:Al in Anode | Initial Fluoride conc. [mg/L] | Final Fluoride conc. [mg/L] | % Fluoride Removal after 30 min Reaction | Settling Vel. [m/h] |
|---|---|---|---|---|
| 95:5 | 20 | 9.8 | 51 | 1.02 |
| 90:10 | 20 | 9.6 | 52 | 0.73 |
| 80:20 | 20 | 1.4 | 93 | 0.23 |
| 70:30 | 20 | 1.2 | 94 | 0.03 |
| 60:40 | 20 | 1.2 | 94.5 | 0.01 |
| 50:50 | 20 | 0.6 | 97 | 0.01 |

Table 8 shows percentage initial and final fluoride concentrations, fluoride removal and settling velocity of the flocculants.

For fluoride removal from drinking water, higher settling velocity is desirable for shorter process time. In this example, all flocculant settling was achieved by gravity settling. At Fe to Al ratio of 50:50, the settling velocity dropped significantly, which significantly delayed the process time. Based on the present example, the Fe to Al ratio in sacrificial anode should be minimum 50:50, preferably minimum 70:30, and most preferably minimum 80:20. On the other hand, in order to obtain sufficient removal of fluoride, the maximum Fe to Al ratio in the sacrificial anode should be maximum 98:2, preferably maximum 95:5. This can also be expressed as that the content of Al shall be between 2-50% by weight, preferably 5-30% by weight most.

Example 5

In this example, dog-bone shaped sacrificial anodes were used with the same contents of iron and aluminum but with different porosity. The iron and aluminum powder used was the same as described in Example 1. The samples were compacted at various compaction pressures resulting in various porosity according to the following table 9.

The anodes were tested with respect to theirs efficiency expressed as the rate of coagulation formation in mg/min*liter. An electrolyte with conductivity of 2.2 mS/cm was prepared by adding NaCl in water. Solid graphite rods were used as cathode. During the test, current was maintained at 0.5 A with a voltage difference of approximately 25 V. During the test the electrolyte was continuously mixed. The reaction was run for 30 minutes in the solution quantified to calculate the rate of flocculent formed.

The anodes were also tested with respect to strength, herein measured as green strength, GS, according to ISO standard 3995.

TABLE 9

| Sample | Compaction pressure [MPa] | Porosity [%] | Rate of coagulant formation [mg/min * liter] | Green Strength [psi] |
|---|---|---|---|---|
| A | 772 | 25 | 60.7 | 9 810 |
| B | 579 | 30 | 64.7 | 7 940 |
| C | 205 | 40 | 73.5 | 4 190 |
| D | 62 | 53 | 89.2 | 1 010 |

Figure 1:
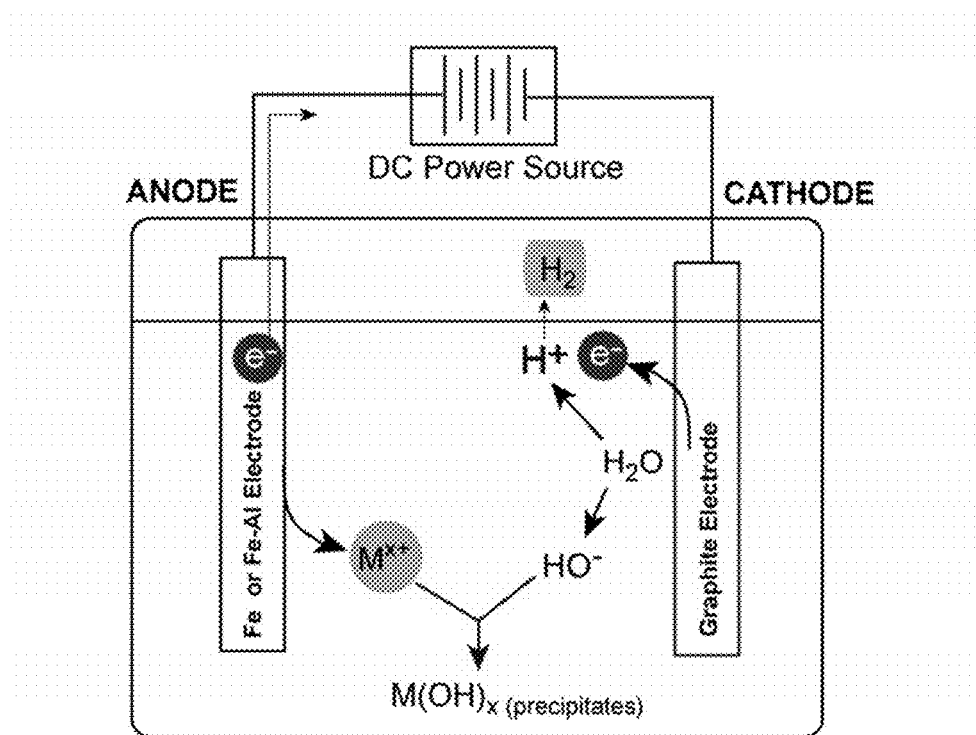
Figure 2:
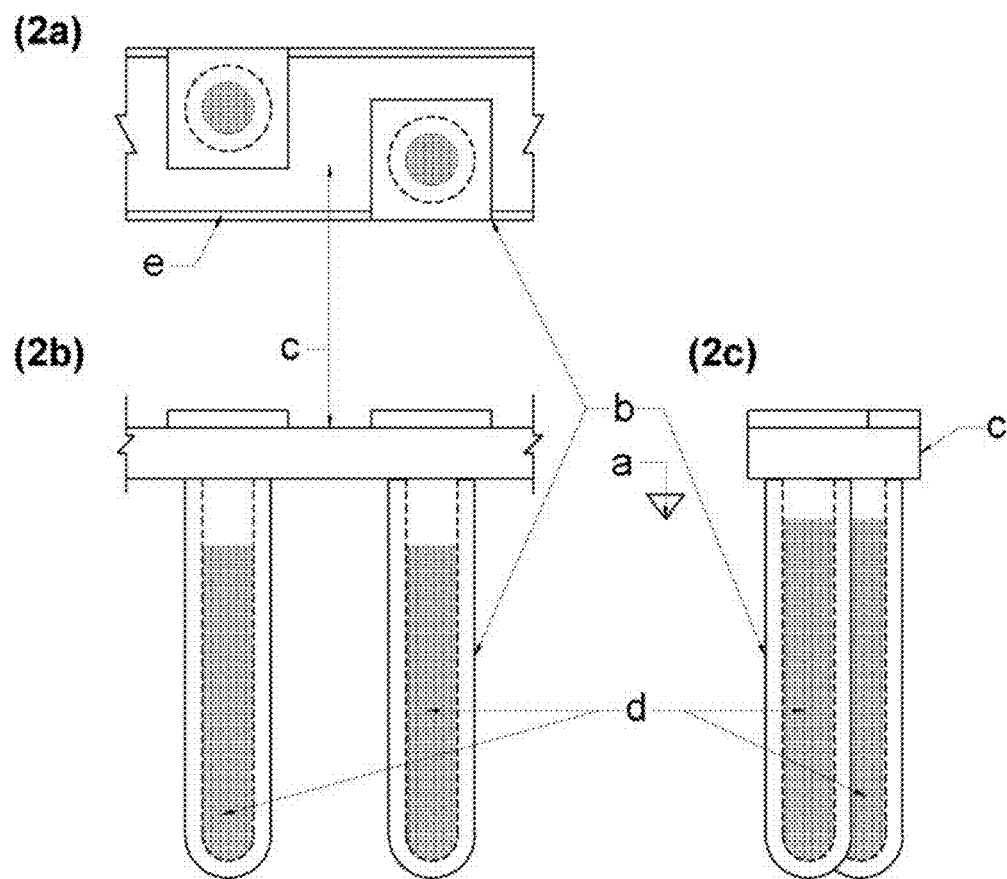
Figure 3:
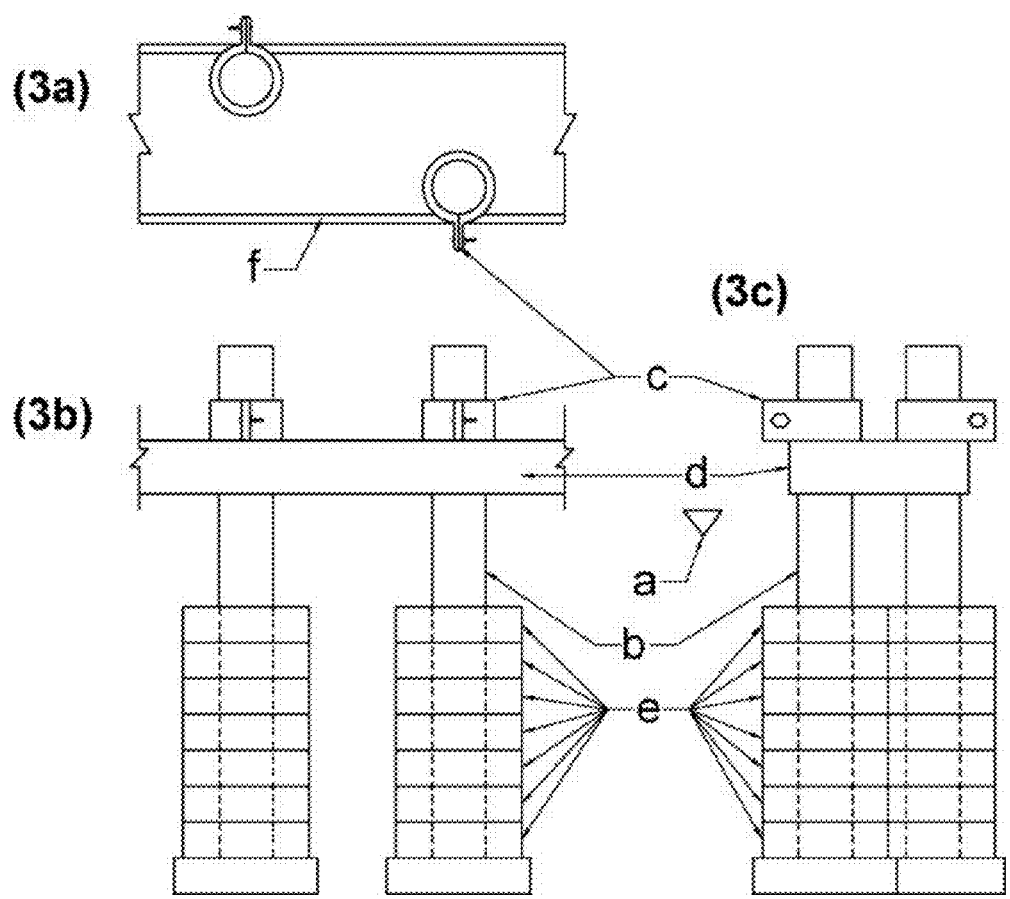
Figure 4:
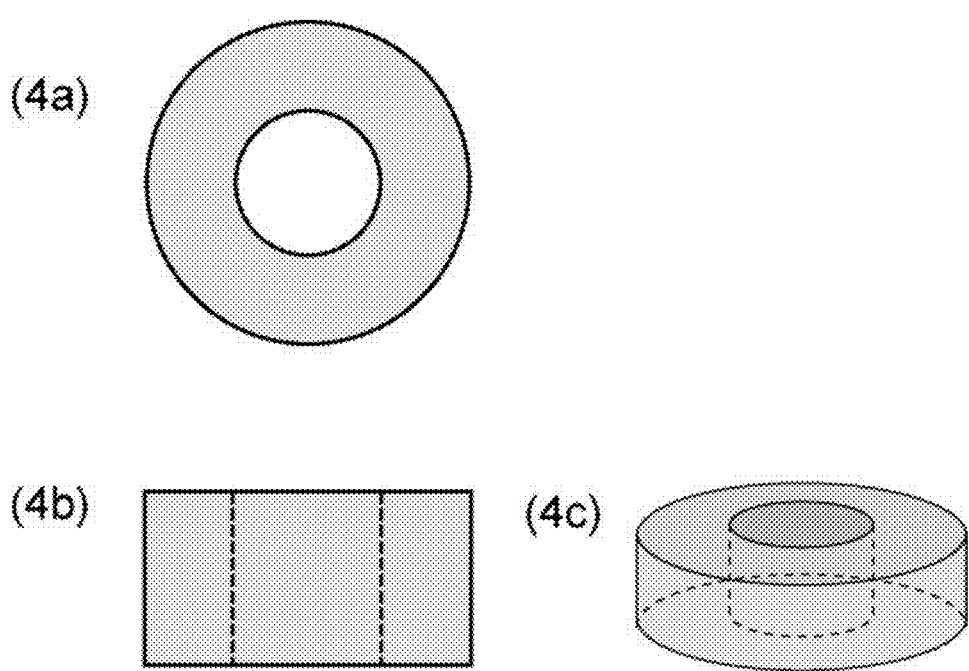
Figure 5:
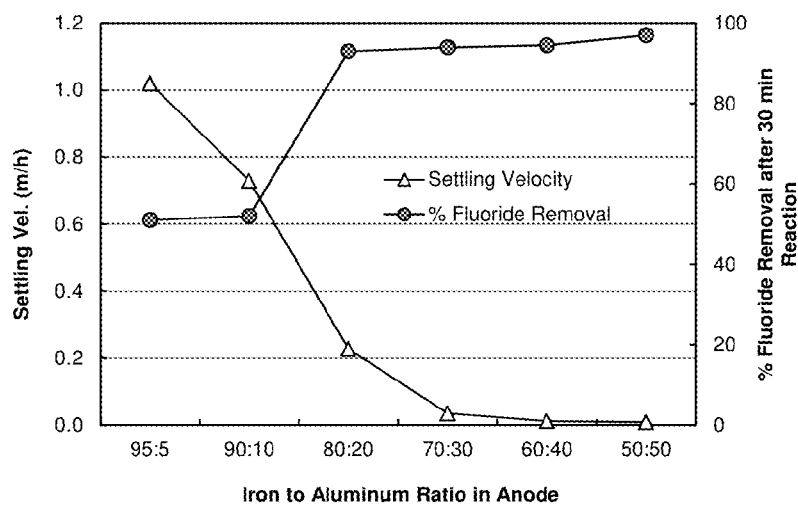
FIG. 5 is a diagram showing settling velocity and fluoride removal capacity as described in example 4.
Figure 6:
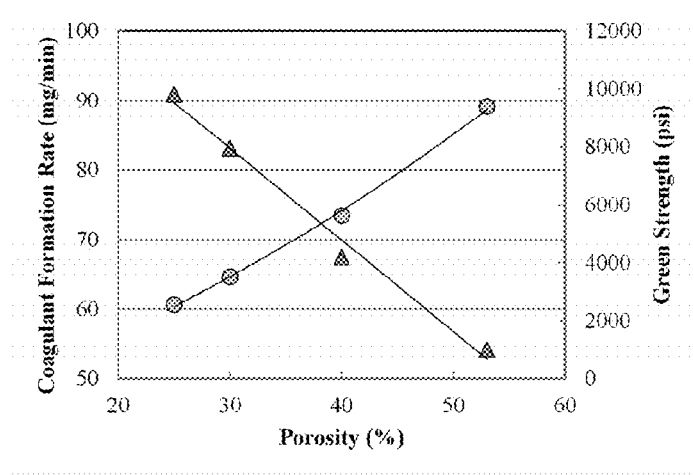
FIG. 6 shows the Rate of coagulant formation and Green Strength as a function of the porosity as described in example 5.

FIG. 6 shows the Rate of coagulant formation and Green Strength as a function of the porosity. In order to obtain sufficient strength of the compacted electrode it is believed that the Green Strength shall be above at least 900 psi, implicating that the maximum porosity shall preferably be at most 55%. In order to obtain sufficient Rate of coagulant formation the porosity should be at least 20%, preferably at least 25 or 30%.

Example 6- Field Test

In order to verify the efficiency of new electrode and electrode assembly during continuous use, a field test was carried out.

Figure 7:
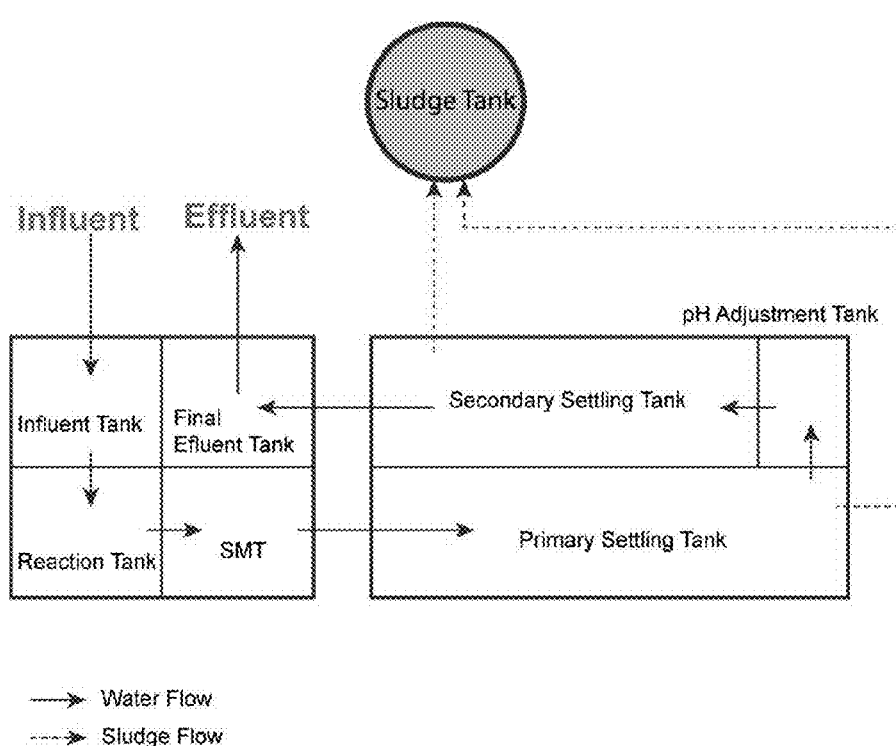
FIG. 7 shows the principle flow chart of the electrocoagulation process in accordance with example 6.
Figure 8:
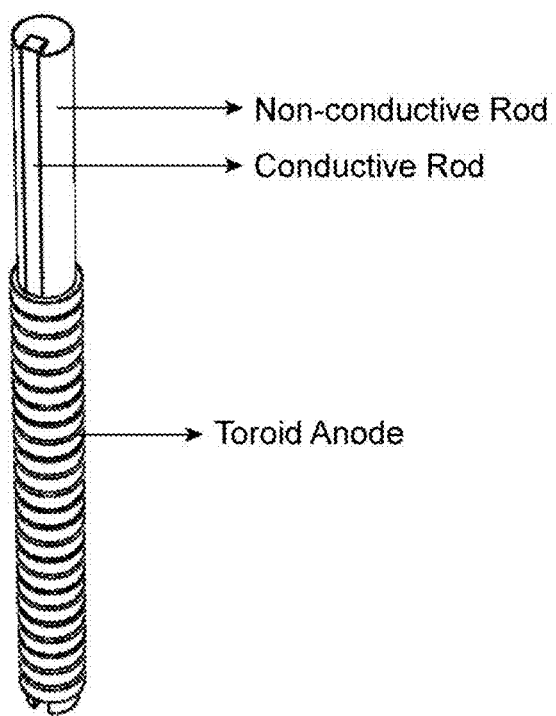
FIG. 8 shows an embodiment of the present invention where the non-sacrificial part of the anode is made of plastic such as poly propylene or PVC, having a rod shape with a groove for accommodating an electric conductive rod or bar distributing electric current to the sacrificial part(s).
Figure 9:
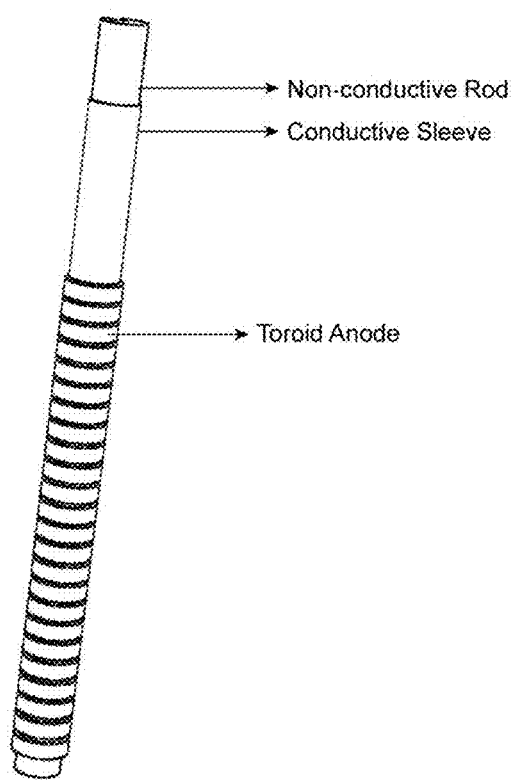
FIG. 9 shows an embodiment of the present invention where the non-sacrificial part of the anode is made of plastic such as poly propylene or PVC, having a rod shape surrounded by an electrical conductive sleeve.

In this field test electrodes as described in example 3 was used, with the exception of that the outer diameter was 2.5 cm. The reaction chamber held 20 anodes and 20 cathodes of identical construction. The porosity of the sacrificial parts of the electrodes was about 50% by volume and they consisted of 10% by weight of Al powder and 90% by weight of Fe powder. Each electrode consisted of 18 rings and having a graphite rod as the conductive part as described in example 3. FIG. 7 shows the principle flow chart of the electrocoagulation process according to the invention used in example 6.

The reactor was operated under continuous mode. Groundwater was directly feed to the reactor without any pretreatment. pH in the reaction tank and pH adjustment tank were maintained at 4.25 and 6.80, respectively. Polarity of anode and cathode was changed every 12 hours. The whole operation period was divided into four distinct phases to find out the best operational combination of power supply and fluoride removal efficiency. To achieve this objective, only current supplied to the unit was changed at different phases and all the other parameters were kept unchanged.

Table 10 below summarizes the water characteristics and results. Influent water had fluoride concentration of 2.1 mg/L. The conductivity of the influent was 1,411 μS/cm.

Test 1

In Test 1, approximately 90% removal of fluoride was targeted. Current supply to the unit was kept approximately at 15 amps. The corresponding voltage was also approximately 15 V. In Phase 1, the overall fluoride removal was 85% with the final fluoride concentration of 0.3 mg/L in the treated water. Power consumption was 2.73 kWh per cubic meter of water treated.

Test 2

In Test 2, approximately 80% removal of fluoride was targeted. Only variable in this phase is power supply. Current supply to the unit is kept approximately at 12 amps, with the corresponding voltage of 14 V. The overall removal of the fluoride is 72% with the final fluoride concentration of 0.55 mg/L in the treated water. Power consumption is 2.26 kWh per cubic meter of water treated.

Test 3

In Test 3, approximately 70% removal of fluoride was targeted. Current supply to the unit is changed to approximately at 10 amps, with the corresponding voltage of approximately 14 V. The overall removal of the fluoride is 78% with the final fluoride concentration of 0.47 mg/L in the treated water. Power consumption is 1.77 kWh per cubic meter of water treated.

Test 4

In Test 4, approximately 60% removal of fluoride was targeted. Current supply to the unit is changed to approximately at 7 amps, with the corresponding voltage of approximately 10 V. The overall removal of the fluoride is 76% with the final fluoride concentration of 0.51 mg/L in the treated water. Power consumption is 1.46 kWh per cubic meter of water treated.

TABLE 10

| | Influent | After Reaction | | | |
| | | Test 1 | Test 2 | Test 3 | Test 4 |
|---|---|---|---|---|---|
| pH | 8.03 | 6.82 | 6.28 | 6.91 | 6.21 |
| Fluoride (mg/L) | 2.1 | 0.30 | 0.55 | 0.47 | 0.51 |
| Conductivity (μS/cm) | 1,411 | 1,824 | 1,832 | 1849 | 1779 |
| % Removal | — | 84.7% | 72.3% | 77.7% | 75.9% |
| Current (Amp) | — | 14.9 | 11.7 | 10.4 | 7.4 |
| Voltage (V) | — | 14.5 | 14.4 | 14.3 | 9.9 |
| Power Consumption (kWh/m3) | — | 2.73 | 2.26 | 1.77 | 1.46 |

It shall especially be noted that the reported Power Consumption is remarkably low and the low Power Consumption is believed to be caused by the construction of the anodes and especially the porous structure of the sacrificial part of the sacrificial anode combined with the type of iron powder used.

The invention claimed is:

1. A sacrificial anode containing a compacted sacrificial part and a non-sacrificial electrical conductive part, the sacrificial part having porosity between 20-60% by volume and containing iron powder, wherein, in the iron powder, the amount of particles below 45 μm is at most 20% by weight.

2. A sacrificial anode according to claim 1, wherein the sacrificial part contains a mixture of iron powder and aluminum powder.

3. A sacrificial anode according to claim 2, wherein the weight ratio between iron powder and aluminum powder 50:50 to 98:2.

4. A sacrificial anode according to claim 1, wherein the iron powder contains at least 90% by weight of iron.

5. A sacrificial anode according to claim 1, wherein the non-sacrificial electrical conductive part of the anode is made of graphite or stainless steel.

6. A sacrificial anode according to claim 5, wherein the sacrificial part of the sacrificial anode is at least one toroid made of the compacted powders surrounding and in close electrical contact with the non-sacrificial electrical conductive part.

7. A sacrificial anode according to claim 1, wherein the non-sacrificial electrical conductive part of the anode has a shape of a porous graphite basket or container.

8. A sacrificial anode according to claim 1, wherein the non-sacrificial electrical conductive part of the anode has a shape of a solid rod, bar, or plate.

9. A sacrificial anode according to claim 1, wherein the sacrificial part has porosity between 30-50% by volume.

10. A sacrificial anode according to claim 1, wherein, in the iron powder, the amount of particles below 45 μm is at most 12% by weight.

11. A sacrificial anode according to claim 1, wherein, in the iron powder, the amount of particles between 45 and 150 μm being 5-50% by weight, the amount of particles between 150 and 250 μm being 5-50% by weight, the amount of particles between 250 and 850 μm being 20-80% by weight.

12. A sacrificial anode according to claim 1, wherein the iron powder has an apparent density between 0.8-3.0 g/cm$^3$.

13. A sacrificial anode according to claim 1, wherein the iron powder has an apparent density between 1.2-1.8 g/cm$^3$.

14. A sacrificial anode according to claim 1, wherein the iron powder has a specific surface area may be between 0.1 and 0.5 m$^2$/g as measured according to BET.

15. A sacrificial anode according to claim 1, wherein the compacted sacrificial part is compacted at a compaction pressure of at least 70 MPa.

16. A sacrificial anode according to claim 1, wherein the iron powder has:

a particle size distribution between 10 μm and 1 mm,
an apparent density as measured according to ISO 3923-1:2008 between 0.8-3.0 g/cm3, and
a specific surface area between 0.1 and 0.5 m2/g as measured according to BET.

17. An electrochemical cell containing a sacrificial electrode according to claim 1 and a cathode.

18. An electrochemical cell according to claim 17, wherein the anode and the cathode are identical in structure.

19. A method for removal of pollutants from water by electrocoagulation comprising:
providing at least one electrochemical cell containing a sacrificial electrode and a cathode, and
contacting water to be purified with the at least one electrochemical cell while supplying an electric potential difference between the cathode and the anode,
wherein the sacrificial electrode is a sacrificial anode containing a compacted sacrificial part and a non-sacrificial electrical conductive part, the sacrificial part having porosity between 20-60% by volume and containing iron powder, wherein, in the iron powder, the amount of particles below 45 μm is at most 20% by weight.

20. A method according to claim 19, wherein the method is stopped when the sacrificial part of the sacrificial anode is at least partly consumed and optionally continued after replacement of the sacrificial part of the sacrificial anode.

21. A method according to claim 19, for removal of pollutants from water by electrocoagulation wherein when the anode and cathode are identical in structure the method further comprises the step of:
switching polarity when the sacrificial part of the sacrificial anode at least partly is consumed.

22. A method according to claim 19, wherein prior to, and/or during, the method, pH is adjusted to a value which prohibits dissolution of formed hydroxide flocculants.

23. A method according to claim 19, wherein the potential difference between the anode and the cathode is sufficient to yield a current density between 15 and 300 A/m$^2$.

24. A method according to claim 19, wherein the water contains heavy metals.

25. A method according to claim 19, wherein the water contains fluoride.

* * * * *